(12) United States Patent
Takaya et al.

(10) Patent No.: US 11,187,957 B2
(45) Date of Patent: Nov. 30, 2021

(54) LIGHT DISTRIBUTION CONTROL ELEMENT, AND DISPLAY DEVICE AND ILLUMINATION DEVICE INCLUDING THE SAME

(71) Applicant: TIANMA JAPAN, LTD., Kanagawa (JP)

(72) Inventors: Tomoki Takaya, Kawasaki (JP); Yukihiro Ito, Kawasaki (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 123 days.

(21) Appl. No.: 16/140,870

(22) Filed: Sep. 25, 2018

(65) Prior Publication Data

US 2019/0101806 A1 Apr. 4, 2019

(30) Foreign Application Priority Data

Sep. 29, 2017 (JP) .............................. JP2017-190770

(51) Int. Cl.
*G02B 26/00* (2006.01)
*G02F 1/167* (2019.01)
(Continued)

(52) U.S. Cl.
CPC ............ *G02F 1/167* (2013.01); *F21V 14/003* (2013.01); *G02F 1/1323* (2013.01);
(Continued)

(58) Field of Classification Search
CPC ...... G02F 1/167; G02F 1/1676; G02F 1/1368; G02F 1/1681; G02F 1/16757;
(Continued)

(56) References Cited

U.S. PATENT DOCUMENTS 7,751,667 B2 7/2010 Daniel et al.
2011/0007381 A1* 1/2011 Paolini, Jr. ........... G09G 3/2003
359/296

(Continued)

FOREIGN PATENT DOCUMENTS

JP 2007-155784 A 6/2007
JP 2016062091 A 4/2016
(Continued)

OTHER PUBLICATIONS

Communication dated Mar. 23, 2021 by the Japanese Patent Office in application No. 2017-190770.

*Primary Examiner* — Mahidere S Sahle
(74) *Attorney, Agent, or Firm* — Sughrue Mion, PLLC

(57) ABSTRACT

A light distribution control element includes a first transparent substrate, a second transparent substrate, first control electrodes and second control electrodes provided on the first transparent substrate, light-transmissive regions provided between the first transparent substrate and the second transparent substrate, and electrophoretic elements including electrophoretic particles charged to a specific polarity and having a light blocking property and optically transmissive dispersant. Each electrophoretic element is provided between two light-transmissive regions. At least a part of at least one of the first control electrodes and at least a part of at least one of the second control electrodes both overlap with each of the plurality of electrophoretic elements. Dispersion of the electrophoretic particles changes depending on potential difference between the first control electrodes and the second control electrodes to change a range of outgoing direction of light transmitted through the light distribution control element.

15 Claims, 16 Drawing Sheets

(51) Int. Cl.
*F21V 14/00* (2018.01)
*G02F 1/13* (2006.01)
*G02F 1/133* (2006.01)
*G02F 1/16761* (2019.01)

(52) U.S. Cl.
CPC ...... *G02F 1/13306* (2013.01); *G02F 1/16761* (2019.01); *G02F 2201/122* (2013.01)

(58) Field of Classification Search
CPC ............... G02F 1/155; G02F 2201/123; G02F 1/16761; G02F 1/1323; G02F 1/13306; G02F 2201/122; F21V 14/003
USPC ........................................................ 359/296
See application file for complete search history.

(56) References Cited

U.S. PATENT DOCUMENTS

| | | | |
|---|---|---|---|
| 2016/0077363 A1 | 3/2016 | Shiota | |
| 2016/0077364 A1* | 3/2016 | Shiota | ............... G02F 1/133308 349/61 |
| 2017/0097554 A1 | 4/2017 | Shiota | |

FOREIGN PATENT DOCUMENTS

| | | |
|---|---|---|
| JP | 2016062092 A | 4/2016 |
| WO | 2015141740 A1 | 9/2015 |

\* cited by examiner

LIGHT DISTRIBUTION CONTROL ELEMENT, AND DISPLAY DEVICE AND ILLUMINATION DEVICE INCLUDING THE SAME

CROSS-REFERENCE TO RELATED APPLICATIONS

This Non-provisional application claims priority under 35 U.S.C. § 119(a) on Patent Application No. 2017-190770 filed in Japan on Sep. 29, 2017, the entire content of which is hereby incorporated by reference.

BACKGROUND

This disclosure relates to an optical element that variably controls the range of outgoing direction of the light transmitted therethrough.

A display device is used under various situations such as when a plurality of persons in a meeting share the display and when only the operator checks the display in a public place. In the former situation, it is desirable that the range of direction in which the display on the screen can be seen, namely, the viewing angle be wide so that the plurality of persons can simultaneously see the display from different directions. In the latter situation, it is desirable that the viewing angle be limited to a narrow range to prevent peeking. To achieve the viewing angle depending on the situation, light distribution control elements (louvers) to be attached to a display device have been disclosed.

For example, the louver disclosed in U.S. Pat. No. 7,751,667 B has a structure in which transparent regions and light absorbing regions containing electrophoretic particles are sandwiched by transparent conductive film electrodes; the directions of light are controlled with the louver so that the display can be seen in only a specific viewing field when the louver is not working (voltage is OFF) and can be seen in a wide viewing angle when the louver is working (voltage is ON).

JP 2007-155784 A discloses a visual field control element provided between a liquid crystal display element and a surface light source. This visual field control element has a structure in which electrochromic layers and transparent layers are alternately laminated and a pair of electrodes to supply electric power to the plurality of electrochromic layers are provided at both ends of the element in the direction orthogonal to the lamination. When no electric power is supplied from the electrodes, the electrochromic layers are clear and colorless, so that the light from the surface light source passes through the electrochromic layers to provide a wide viewing angle; when electric power is supplied, the electrochromic layers become colored, the colored regions work as light blockers to provide a narrow viewing angle.

SUMMARY

An aspect of the disclosure is a light distribution control element including: a first transparent substrate; a second transparent substrate provided to be opposed to the first transparent substrate; a plurality of first control electrodes and a plurality of second control electrodes provided on a face of the first transparent substrate that is opposed to the second transparent substrate; a plurality of light-transmissive regions provided between the first transparent substrate and the second transparent substrate; and a plurality of electrophoretic elements including electrophoretic particles charged to a specific polarity and having a light blocking property and optically transmissive dispersant, each electrophoretic element being provided between two light-transmissive regions adjacent to each other, wherein the plurality of first control electrodes and the plurality of second control electrodes are disposed in such a manner that at least a part of at least one of the first control electrodes and at least a part of at least one of the second control electrodes both overlap with each of the plurality of electrophoretic elements, and wherein dispersion of the electrophoretic particles changes depending on potential difference between the plurality of first control electrodes and the plurality of second control electrodes to change a range of outgoing direction of light transmitted through the light distribution control element.

It is to be understood that both the foregoing general description and the following detailed description are exemplary and explanatory and are not restrictive of this disclosure.

EMBODIMENTS

Hereinafter, embodiments of this invention will be described in detail with reference to the accompanying drawings. It should be noted that the embodiments are merely examples to implement this invention and are not to limit the technical scope of this invention. Elements common to the drawings are denoted by the same reference signs.

Embodiment 1

Figure 1A:
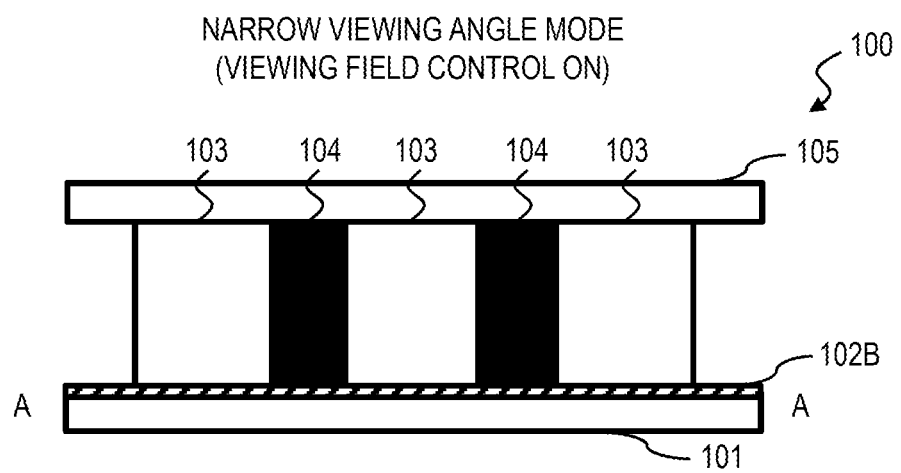
FIGS. 1A and 1B are explanatory diagrams for illustrating a structure of a light distribution control element in a narrow viewing angle mode in Embodiment 1.
Figure 1B:
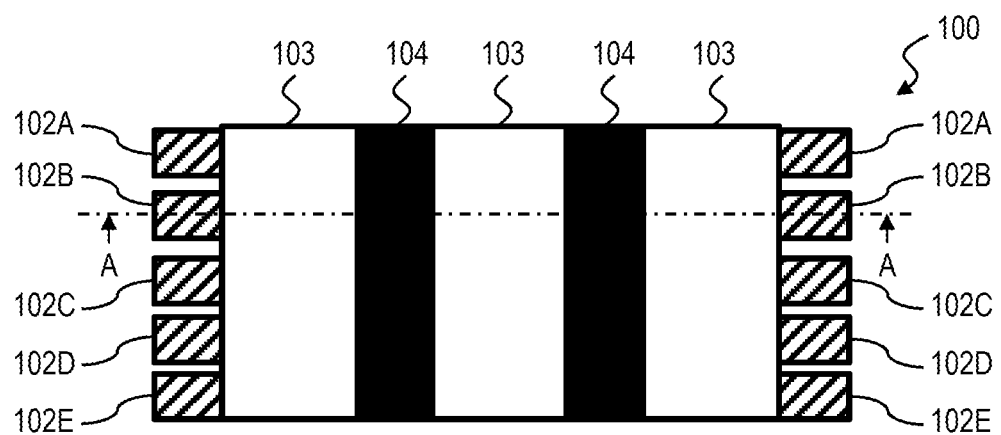

FIGS. 1A and 1B are explanatory diagrams for illustrating a structure of a light distribution control element in a narrow viewing angle mode in Embodiment 1.

Specifically, FIGS. 1A and 1B are a cross-sectional diagram and a plane diagram, respectively, of a light distribution control element 100 in this embodiment controlled to a narrow viewing angle mode.

As illustrated in FIG. 1A, the light distribution control element 100 in this embodiment includes a lower transparent substrate (first transparent substrate) 101, an upper transparent substrate (second transparent substrate) 105 disposed to be opposed to the lower transparent substrate 101, a plurality of control electrodes 102 (including a control electrode 102B) provided on the top face (or the face opposed to the upper transparent substrate 105) of the lower transparent substrate 101, a plurality of transparent ribs (light transmissive regions) 103 provided between the lower transparent substrate 101 with a plurality of control electrodes 102 and the upper transparent substrate 105, and a plurality of electrophoretic elements 104 each provided between ribs 103 adjacent to the electrophoretic element 104

The lower transparent substrate 101 and the upper transparent substrate 105 are flat substrates made of a transparent material such as glass, polyethylene terephthalate (PET), poly carbonate (PC), or polyethylene naphthalate (PEN).

The control electrodes 102 are transparent conductive films made of indium-tin-oxide (ITO), for example. A plurality of strip-like control electrodes 102 are disposed on the lower transparent substrate 101 at predetermined intervals.

FIG. 1B is a plan diagram of the light distribution control element 100 in this embodiment and FIG. 1A is a cross-sectional diagram cut along the line A-A in FIG. 1B. However, FIG. 1B omits the lower transparent substrate 101 and the upper transparent substrate 105 for convenience of explanation. FIG. 1B includes control electrodes 102A to 102E as an example of the plurality of control electrodes 102. In providing description about all control electrodes 102A to 102E collectively or providing description common to the control electrodes 102A to 102E, these control electrodes may be generally referred to as control electrode(s) 102.

The plurality of control electrodes 102 includes a plurality of first control electrodes (first transparent conductive films) and a plurality of second control electrodes (second transparent conductive films). The first control electrodes and the second control electrodes may be disposed alternately. In the example of FIG. 1B, the control electrodes 102A, 102C and 102E in the odd-numbered rows are first control electrodes and the control electrodes 102B and 102D in the even-numbered rows are second control electrodes. As will be described later, in the wide viewing angle mode, the potentials for the control electrodes 102 are controlled to generate a predetermined potential difference between the plurality of first control electrodes 102 and the plurality of second control electrodes 102.

The ribs 103 are made of a photo-curable material, for example. The ribs 103 are formed on the lower transparent substrate 101 with control electrodes 102 by photolithography, for example, to have a specified width and specified intervals. In general, the height of each rib 103 is preferably in a range from 3 μm to 300 μm; the width of each rib 103 is preferably in a range from 1 μm to 150 μm; the interval between ribs 103 (or the width of the later-described electrophoretic element 104) is preferably within a range from 0.25 μm to 40 μm. It should be noted that this embodiment is not to limit the height, width and interval of the ribs 103 to the foregoing values.

Between two ribs 103 adjacent to each other, an electrophoretic element 104 is provided. The electrophoretic element 104 is a mixture of optically transmissive and fluid dispersant and electrophoretic particles having a light blocking property and charged to a specific polarity. Although described hereinafter is an example where the electrophoretic particles are negatively charged, the electrophoretic particles may be positively charged. The electrophoretic particles can move within an electrophoretic element 104 because of the fluidity of the dispersant. In the narrow viewing angle mode, all control electrodes 102 are set to the same potential; no potential gradient is generated within the electrophoretic element 104. For this reason, the electrophoretic particles are dispersed in the electrophoretic element 104 without gathering to any control electrode 102. When the electrophoretic particles are uniformly dispersed in the electrophoretic element 104, the whole electrophoretic element 104 shows a light blocking property. In other words, in the narrow viewing angle mode illustrated in FIG. 1A, the whole electrophoretic element 104 becomes a light blocker.

For example, in the case where the light distribution control element 100 in this embodiment is mounted on a display device such as a liquid crystal panel, the light emitted from the display device passes through the lower transparent substrate 101, the control electrodes (transparent conductive films) 102, the ribs 103, and the upper transparent substrate 105 successively. In this travel of the light, the electrophoretic elements 104 having a light-blocking property between ribs 103 work as a louver, so that the range of outgoing direction of the light transmitted through the light distribution control element 100 becomes narrower than the range of outgoing direction in the later-described wide viewing angle mode. As a result, the viewing angle is narrowed.

In this example, the strip-like control electrodes 102 are provided to have their long sides in the direction orthogonal to the boundary between a rib 103 and an electrophoretic element 104 (the horizontal direction in FIG. 1B), as illustrated in FIG. 1B. FIG. 1B illustrates a state where the ribs 103 and the electrophoretic elements 104 are provided above the control electrodes 102 and does not show the parts of the control electrodes 102 that are hidden under the ribs 103 and the electrophoretic elements 104; however, the actual control electrodes 102 are unseparated in the horizontal direction as illustrated in FIG. 1A.

The foregoing disposition of the control electrodes 102, ribs 103, and electrophoretic elements 104 is merely an example; different disposition is available as will be described later (for example, refer to Embodiment 2). However, it is necessary that each electrophoretic element 104 is overlapped with at least one first control electrode in a part and further, overlapped with at least one second control electrode in another part. In the example of FIG. 1A, each electrophoretic element 104 is overlapped with each of the control electrodes 102A to 102E.

This embodiment can omit the upper transparent substrate 105. In that case, however, the electrophoretic elements 104 needs to be sealed up so that the dispersant will not flow out.

Figure 2A:
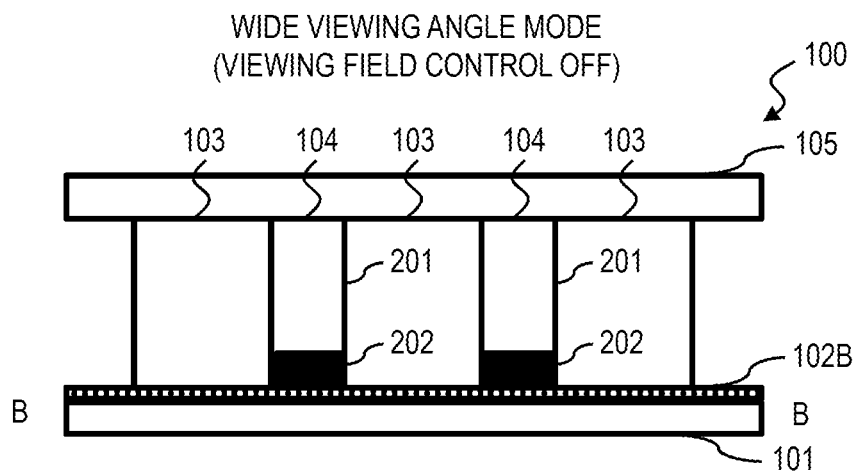
FIGS. 2A to 2C are explanatory diagrams for illustrating a structure of a light distribution control element in a wide viewing angle mode in Embodiment 1.
Figure 2B:
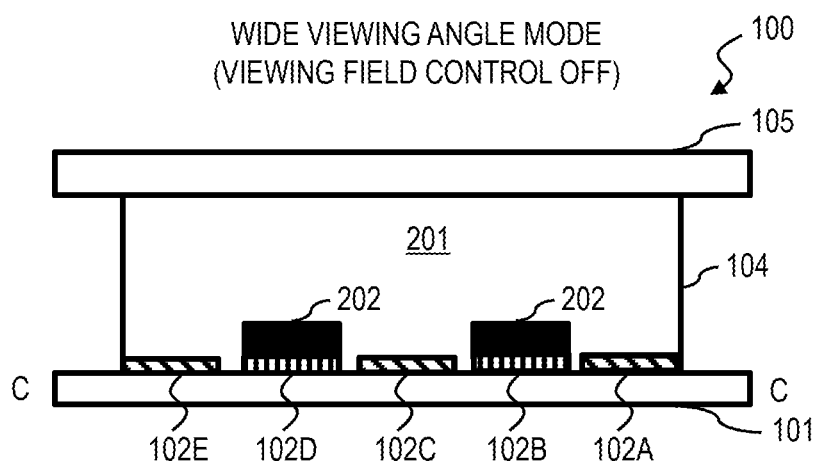
Figure 2C:
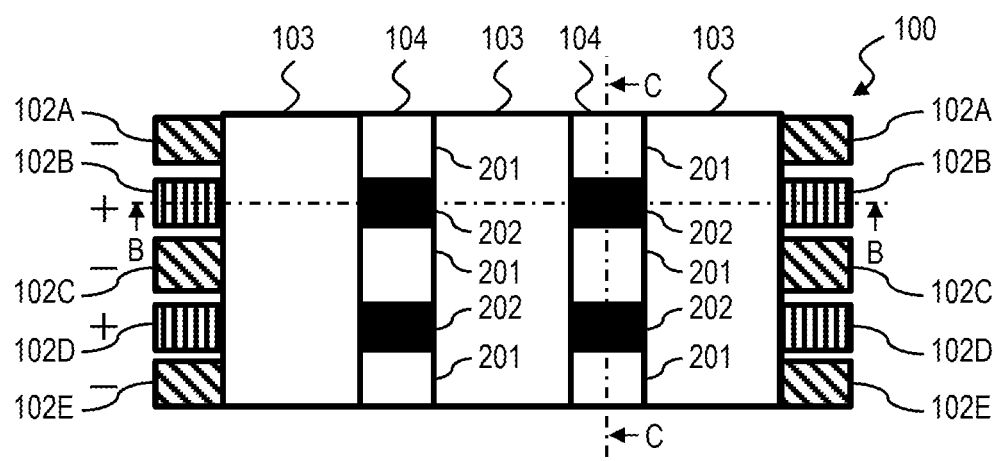

FIGS. 2A to 2C are explanatory diagrams for illustrating a structure of a light distribution control element in a wide viewing angle mode in Embodiment 1.

Specifically, FIG. 2C is a plane diagram of the light distribution control element 100 illustrated in FIG. 1A when the light distribution control element 100 is set to the wide viewing angle mode. FIG. 2A is a cross-sectional diagram of the light distribution control element 100 cut along the line B-B extending in the longitudinal direction of a control electrode 102 in FIG. 2C. FIG. 2B is a cross-sectional diagram of the same cut along the line C-C extending in the direction orthogonal to a long side of the control electrode 102 in FIG. 2C.

In the wide viewing angle mode, the potentials for the control electrodes 102 are controlled to generate a predetermined potential difference (for example, approximately 20 to 25 V DC) between the first control electrodes and the second control electrodes. In the example of FIG. 2A, the first control electrodes 102A, 102C, and 102E are provided with negative potentials and the second control electrodes 102B and 102D are provided with positive potentials. In this condition, potential gradients are generated in each electrophoretic element 104; the electrophoretic particles in the electrophoretic element 104 gather around the control electrodes 102 having the polarity opposite to the polarity of the charge of the electrophoretic particles among the plurality of control electrodes 102 overlapped with the electrophoretic element 104.

Since the electrophoretic particles are charged negatively in the example of FIG. 2A, they gather around the positive second control electrodes 102B and 102D. As a result, in each electrophoretic element 104, the regions around the second control electrodes 102B and 102D that collect electrophoretic particles become light-blocking regions 202 having a light blocking property. On the other hand, the regions distant from the second control electrodes 102B and 102D become less dense with electrophoretic particles to become transparent regions 201 that transmit light.

As a result, the region close to the upper transparent substrate 105 in each electrophoretic element 104 becomes a transparent region 201, as illustrated in FIGS. 2A and 2B. That is to say, the light passing through the light distribution control element 100 passes not only the transparent ribs 103 but also the transparent regions 201 of the electrophoretic elements 104 and therefore, compared to the narrow viewing angle mode in FIG. 1A, the range of outgoing direction of the light transmitted through the light distribution control element 100 becomes wider than the range of outgoing direction in the above-described narrow viewing angle mode, expanding the viewing angle. Furthermore, as illustrated in FIG. 2C, the electrophoretic particles are collected around the second control electrodes 102B and 102D and the regions around the first control electrodes 102A, 102C, and 102E provided with potentials of the same polarity as the electrophoretic particles become transparent regions 201; the area of the light-transmissive regions increases to increase the brightness of the screen felt by the user of the display device.

The light distribution control element 100 in this embodiment can be manufactured by patterning the control electrodes 102 on the lower transparent substrate 101 and therefore, upsizing is available easily.

Moreover, the light distribution control element 100 in this embodiment produces light-blocking regions and transparent regions with difference in density of electrophoretic particles and therefore, the non-uniformity in black color development (or the non-uniformity of the brightness within the light distribution control element 100) is prevented.

Figure 2D:
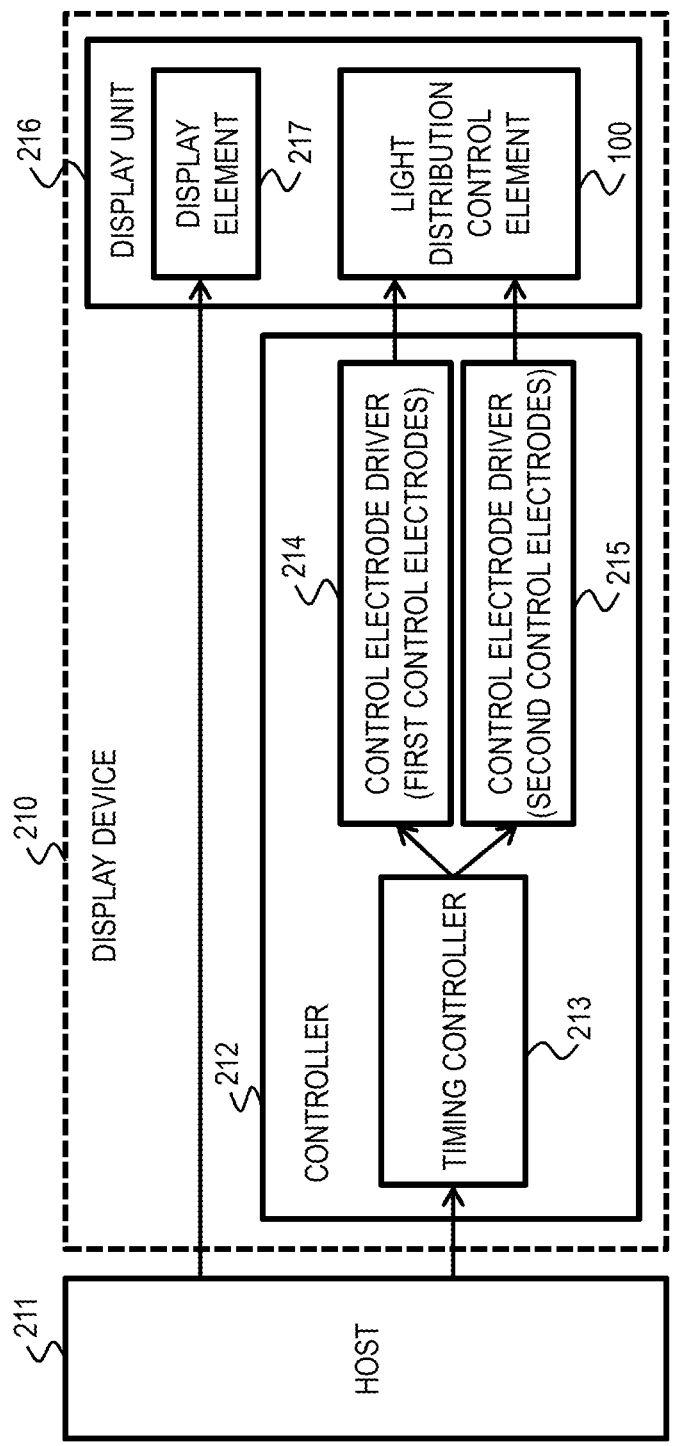
FIG. 2D is a block diagram for illustrating a configuration of a display device including the light distribution control element in Embodiment 1.

FIG. 2D is a block diagram for illustrating a configuration of a display device including the light distribution control element in Embodiment 1.

The display device 210 in FIG. 2D includes a display unit 216 and a controller 212. The display unit 216 includes a light distribution control element 100 and a display element 217. The controller 212 is connected with a host 211 and controls the potentials to be applied to the light distribution control element 100.

The host 211 is an information processing device such as a personal computer, a mobile phone, a smartphone, a tablet terminal, or a personal digital assistant (PDA), and outputs a signal to display a result of processing performed therein. The display unit 216 may be connected at the external of the host 211 or integrated with the host 211 like in the case where the host 211 is a smartphone.

Figure 2E:
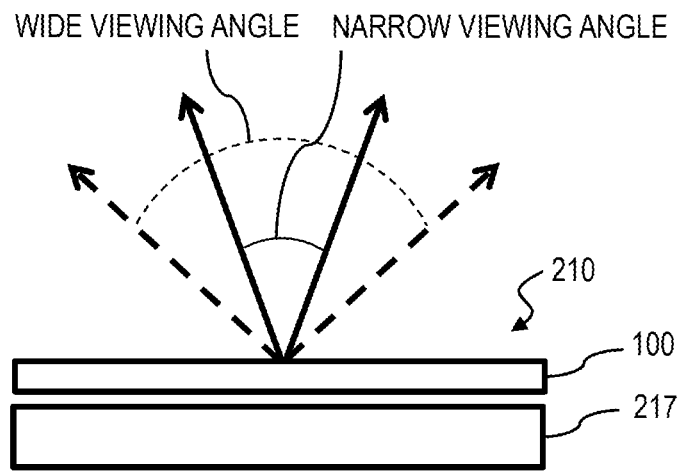
FIG. 2E is a schematic diagram for illustrating the configuration of the display device including the light distribution control element in Embodiment 1.

FIG. 2E is a schematic diagram for illustrating the configuration of the display device including the light distribution control element in Embodiment 1. The display element 217 can be an organic EL element or a liquid crystal element connected with the host 211 to display an image in accordance with a signal output from the host 211. As illustrated in FIG. 2E, the light distribution control element 100 is provided above the surface of the display element 217 where an image is displayed. For example, the display element 217 is provided under the lower transparent substrate 101 of the light distribution control element 100 in FIG. 1A (in other words, on the other side of the lower transparent substrate 101 different from the side opposed to the upper transparent substrate 105). The light radiated from the display element 217 enters the lower transparent substrate 101, passes through the lower transparent substrate 101, the ribs 103, and the upper transparent substrate 105 in this order, and goes out upward from the upper transparent substrate 105. As described above, when the light from the display element 217 passes through the light distribution control element 100, the range of outgoing direction of the light transmitted through the light distribution control element 100 is controlled. In the case where the display element 217 is a liquid crystal element, the light distribution control element 100 can be disposed between the light source (backlight) and the liquid crystal panel.

The potentials to be applied to the control electrodes 102 of the light distribution control element 100 are controlled by the controller 212. The controller 212 includes a timing controller 213, a control electrode driver 214 and another control electrode driver 215. The timing controller 213 generates control signals for controlling when to change the potentials of the control electrodes 102 and inputs the signals to the control electrode driver 214 and the control electrode driver 215. The control electrode driver 214 and the control electrode driver 215 respectively generate the potential to be applied to the first control electrodes 102A, 102C, and 102E and the potential to be applied to the second control electrodes 102B and 102D at desired times in accordance with the control signal from the timing controller 213.

Now, an example of controlling the potentials of the control electrodes 102 when the light distribution control element 100 is changed from the narrow viewing angle mode to the wide viewing angle mode at a time t1 and changed from the wide viewing angle mode to the narrow viewing angle mode at a time t3 is described. In this example, all control electrodes 102 in the narrow viewing angle mode are controlled to have the same potential (V0).

In the wide viewing angle mode, the first control electrodes 102A, 102C, and 102E are controlled to have a potential V1 and the second control electrodes 102B and 102D are controlled to have a potential V2 so that a predetermined potential difference (V2−V1) is generated between the first control electrodes and the second control electrodes. The same applies to the control of the control electrodes 102 in Embodiment 3, which will be described later.

In this example, the timing controller 213 inputs a control signal to change the potentials of the first control electrodes 102A, 102C, and 102E from V0 to V1 to the control electrode driver 214 and inputs a control signal to change the potentials of the second control electrodes 102B and 102D from V0 to V2 to the control electrode driver 215 at the time t1. In response, the control electrode driver 214 applies a potential V1 to the first control electrodes 102A, 102C, and 102E in accordance with the control signal from the timing controller 213 after the time t1. The control electrode driver 215 applies a potential V2 to the second control electrodes 102B and 102D in accordance with the control signal from the timing controller 213 after the time t1.

The timing controller 213 further inputs a control signal to change the potentials of the first control electrodes 102A, 102C, and 102E from V1 to V0 to the control electrode driver 214 and inputs a control signal to change the potentials of the second control electrodes 102B and 102D from V2 to V0 to the control electrode driver 215 at the time t3. The control electrode driver 214 applies a potential V0 to the first control electrodes 102A, 102C, and 102E in accordance with the control signal from the timing controller 213 after the time t3. The control electrode driver 215 applies a potential V0 to the second control electrodes 102B and 102D in accordance with the control signal from the timing controller 213 after the time t3.

The timing controller 213 may generate the above-described control signals in response to a viewing angle mode switching signal from the host 211. For example, when the user of the host 211 inputs an instruction to change the viewing angle mode from the narrow viewing angle mode to the wide viewing angle mode to the host 211, the host 211 sends the instruction to the timing controller 213 and the timing controller 213 in receipt of the instruction generates the control signals generated at the time t1. In similar, when the user of the host 211 inputs an instruction to change the viewing angle mode from the wide viewing angle mode to the narrow viewing angle mode to the host 211, the host 211 sends the instruction to the timing controller 213 and the timing controller 213 in receipt of the instruction generates the control signals generated at the time t3.

As a result of the above-described control by the controller 212, a display device including the light distribution control element 100 can switch the wide viewing angle mode and the narrow viewing angle mode at appropriate times.

Figure 2F:
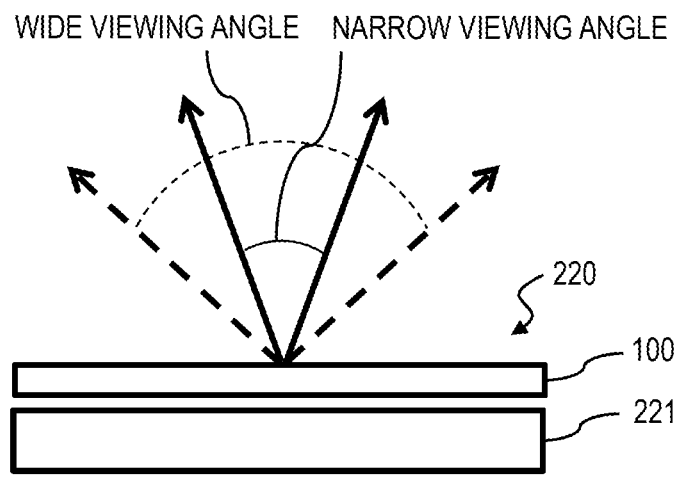
FIG. 2F is a schematic diagram for illustrating a configuration of an illumination device including the light distribution control element of Embodiment 1.

Although FIGS. 2D and 2E provide an example where the light distribution control element 100 in this embodiment is applied to a display device, the light distribution control element 100 is applicable to an illumination device. FIG. 2F is a schematic diagram for illustrating a configuration of an illumination device including the light distribution control element of Embodiment 1. As illustrated in FIG. 2F, the illumination device 220 is configured by replacing the display element 217 with a light source 221 such as a cold cathode tube or a light emitting diode (LED). The host 211 can be omitted; in that case, an instruction to change the viewing angle mode is input to the controller 212 by the user through a not-shown input device such as a button. The timing controller 213 generates control signals like the above-described ones in accordance with the received instruction and inputs them to the control electrode driver 214 and the control electrode driver 215. As a result, the range of outgoing direction of the light emitted from the light source and transmitted through the light distribution control element 100 is controlled.

Figure 3:
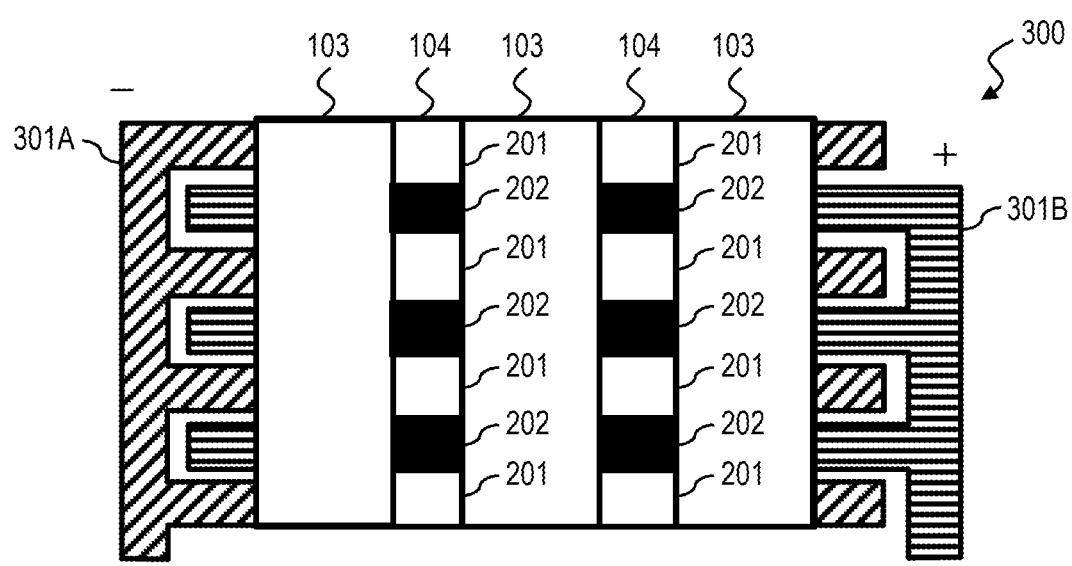
FIG. 3 is an explanatory diagram for illustrating another example of the shape of control electrodes in the light distribution control element in Embodiment 1.

FIG. 3 is an explanatory diagram for illustrating another example of the shape of the control electrodes in the light distribution control element in Embodiment 1.

Specifically, FIG. 3 is a plane diagram of a light distribution control element 300 as the first modified example of the light distribution control element 100 in Embodiment 1. The light distribution control element 300 is the same as the light distribution control element 100 except that the above-described control electrodes 102A to 102E in Embodiment 1 are replaced by control electrodes 301A and 301B. Like FIG. 1B, FIG. 3 omits the lower transparent substrate 101 and the upper transparent substrate 105.

The control electrode 301A is integrally formed in such a shape that strip-like transparent conductive films like the first control electrodes 102A, 102C, and 102E in FIG. 1B are connected together at one end. In similar, the control electrode 301B is integrally formed in such a shape that strip-like transparent conductive films like the second control electrodes 102B and 102D in FIG. 1B are connected together at the other end. In the example of FIG. 3, the control electrode 301A corresponds to the first control electrode (first transparent conductive film) and the control electrode 301B corresponds to the second control electrode (second transparent conductive film).

Forming the electrodes in these shapes enables control using only two control electrodes and reduces the space of the wires for the control electrodes.

Figure 4A:
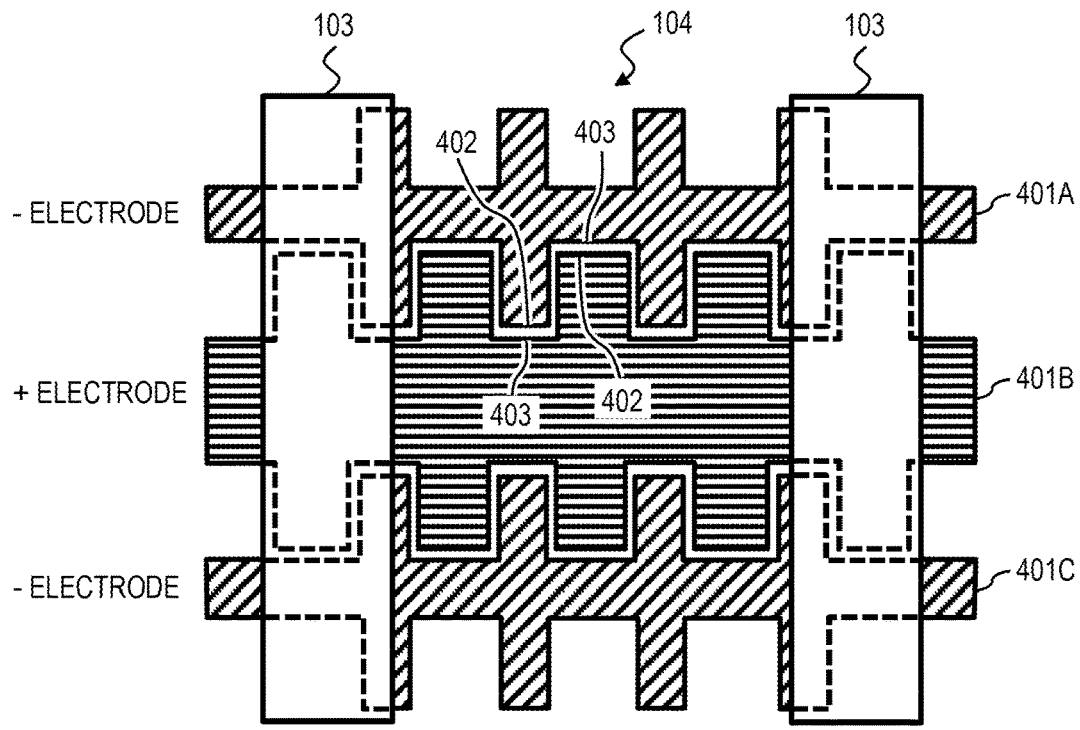
FIGS. 4A and 4B are explanatory diagrams for illustrating yet other examples of the shape of the control electrodes in the light distribution control element in Embodiment 1.
Figure 4B:
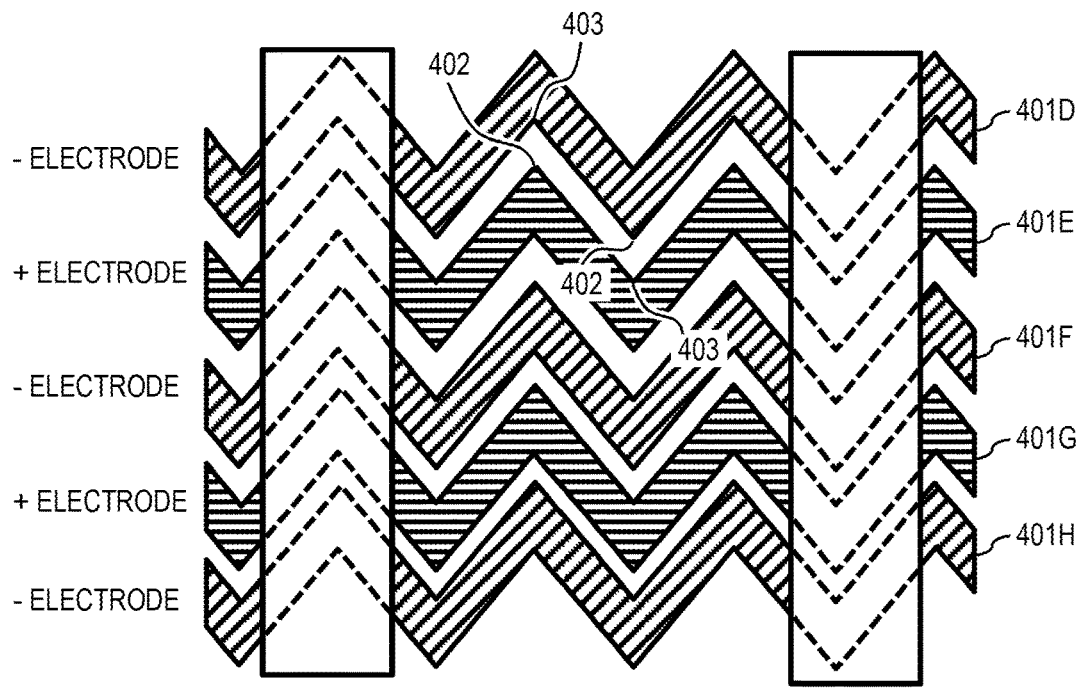

FIGS. 4A and 4B are explanatory diagrams for illustrating yet other examples of the shape of the control electrodes in the light distribution control element in Embodiment 1.

Specifically, FIGS. 4A and 4B are plane diagrams of examples of control electrodes to replace the control electrodes 102A to 102E in FIG. 1B. The control electrodes in FIGS. 4A and 4B are strip-like control electrodes having their long sides in the direction orthogonal to the boundary between a rib 103 and an electrophoretic element 104 and have projections jutting toward the control electrodes adjacent thereto and indents recessed correspondingly to the projections of the adjacent control electrodes.

The control electrodes 401A to 401C in FIG. 4A have rectangular projections 402 and rectangular indents 403 corresponding thereto. For example, the control electrodes 401A and 401C can be the first control electrodes and the control electrode 401B can be the second control electrode. In FIGS. 4A and 4B, the parts of the control electrodes 401 covered by ribs 103 are outlined by dashed lines.

The control electrodes 401D to 401H in FIG. 4B have triangular projections 402 and triangular indents 403 corresponding thereto. For example, the control electrodes 401D, 401F, and 401H can be the first control electrodes and the control electrodes 401E and 401G can be the second control electrodes.

The above-described shapes of the projections and indents are examples; the control electrodes 401 may have projections and indents having shapes other than the foregoing examples. The control electrodes 401 having such shapes achieve almost uniform field intensity distribution in each electrophoretic element 104, enhancing the collection of electrophoretic particles in the wide viewing angle mode.

The light distribution control element in the foregoing embodiment generates electric fields between electrodes adjacent to each other in the same plane to drive the electrophoretic particles. This achieves smaller area covered by electrophoretic particles in the wide viewing angle mode, which leads to high optical transmittance and low power consumption.

The light distribution control element of this embodiment can be manufactured by patterning the electrodes on one face of the element. This achieves low manufacturing cost and allows upsizing easily.

Furthermore, the light distribution control element of this embodiment produces light absorbing regions by utilizing the difference in density of electrophoretic particles. This prevents non-uniformity in black color development.

Embodiment 2

Hereinafter, Embodiment 2 of this invention is described. The following description omits the parts of Embodiment 2 in common with Embodiment 1.

Figure 5A:
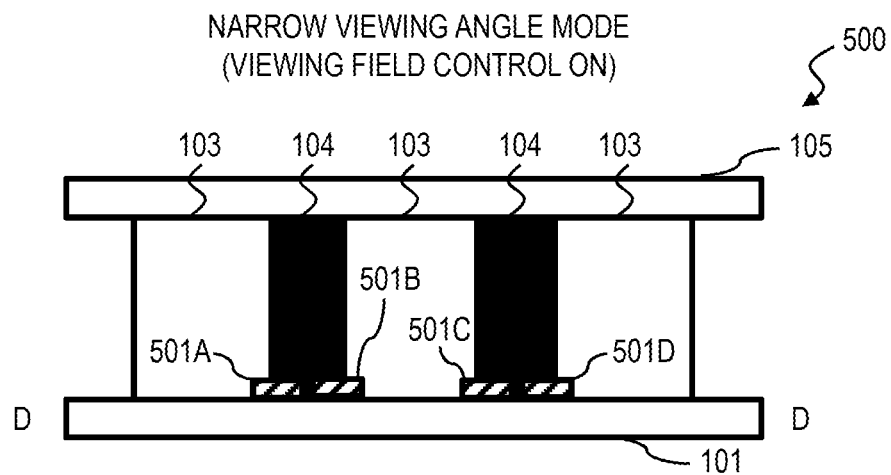
FIGS. 5A and 5B are explanatory diagrams for illustrating a structure of a light distribution control element in a narrow viewing angle mode in Embodiment 2.
Figure 5B:
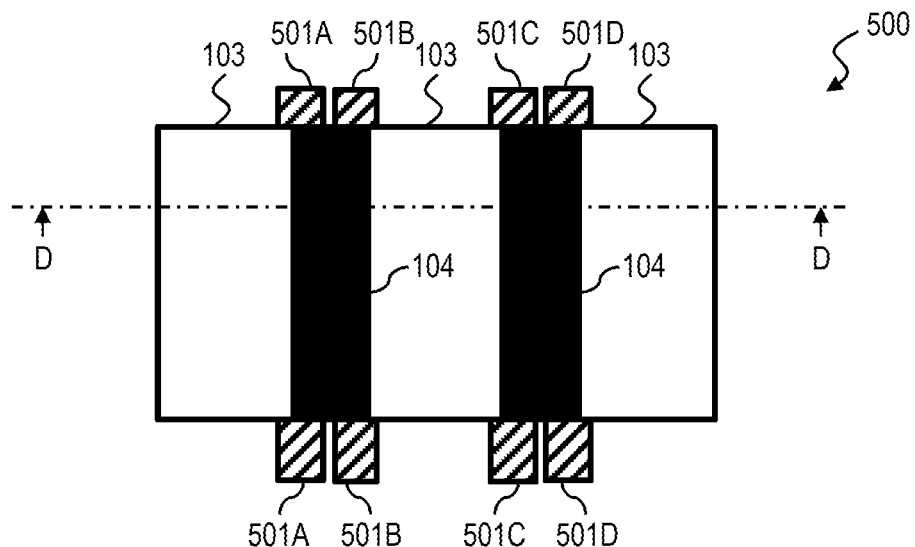

FIGS. 5A and 5B are explanatory diagrams for illustrating a structure of a light distribution control element in the narrow viewing angle mode in Embodiment 2.

The structure of the light distribution control element 500 in Embodiment 2 illustrated in FIGS. 5A and 5B is the same as the structure of the light distribution control element 100 in Embodiment 1 illustrated in FIG. 1A, except for the disposition of the control electrodes. FIG. 5B is a plane diagram of the light distribution control element 500 in Embodiment 2 and FIG. 5A is a cross-sectional diagram cut along the line D-D in FIG. 5B. However, FIG. 5B omits the lower transparent substrate 101 and the upper transparent substrate 105 for convenience of explanation.

The control electrodes 501A to 501D in Embodiment 2 are strip-like control electrodes having their long sides in the direction parallel to the boundary between a rib 103 and an electrophoretic element 104 (or the vertical direction in FIG. 5B). In this example, the control electrodes 501A and 501C are first control electrodes and the control electrodes 501B and 501D are second control electrodes. In the example of FIG. 5A, the first control electrode 501A and the second control electrode 501B are provided to overlap with the same single electrophoretic element 104 and the first control electrode 501C and the second control electrode 501D are provided to overlap with another electrophoretic element 104.

Like in Embodiment 1, when providing description about all control electrodes 501A to 501D collectively or providing description common to the control electrodes 501A to 501D, these control electrodes may be generally referred to as control electrode(s) 501. As will be described later, the potentials for the control electrodes 501 in the wide viewing angle mode are controlled so that a predetermined potential difference is generated between the first control electrodes 501A and 501C and the second control electrodes 501B and 501D, like in Embodiment 1.

In the narrow viewing angle mode illustrated in FIG. 5A, the first control electrodes 501A and 501C and the second control electrodes 501B and 501D are set to the same potential; accordingly, the electrophoretic particles are dispersed in the electrophoretic elements 104 so that the whole electrophoretic elements 104 become light blockers, like in the narrow viewing angle mode in Embodiment 1.

FIGS. 6A to 6D are explanatory diagrams for illustrating a structure of a light distribution control element in the wide viewing angle mode in Embodiment 2.

Figure 6A:
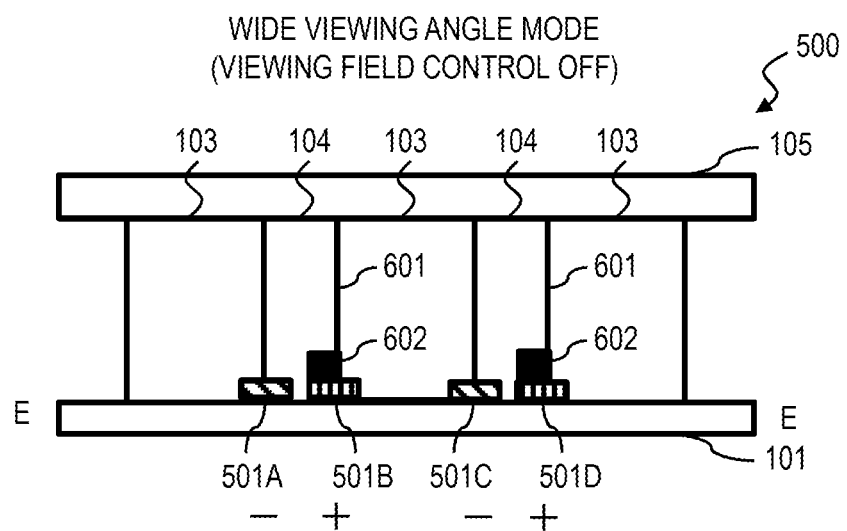
FIGS. 6A to 6D are explanatory diagrams for illustrating a structure of a light distribution control element in a wide viewing angle mode in Embodiment 2.
Figure 6B:
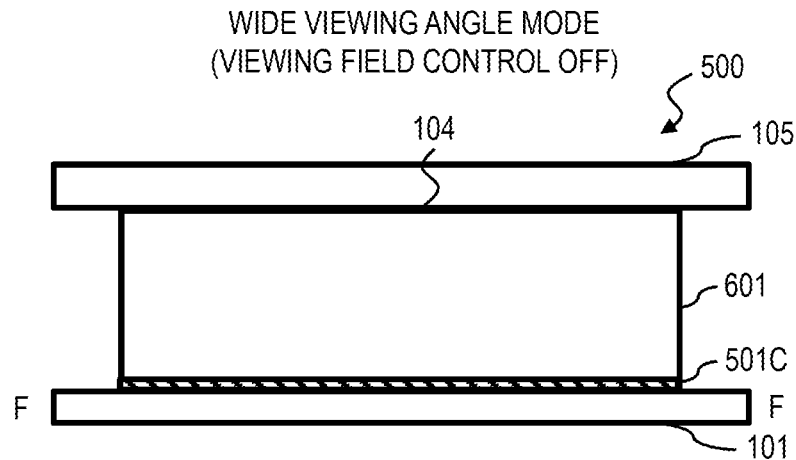
Figure 6C:
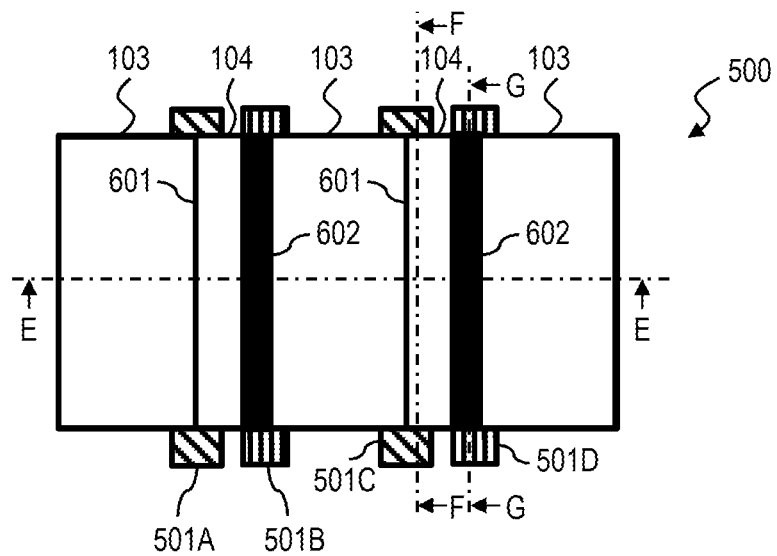
Figure 6D:
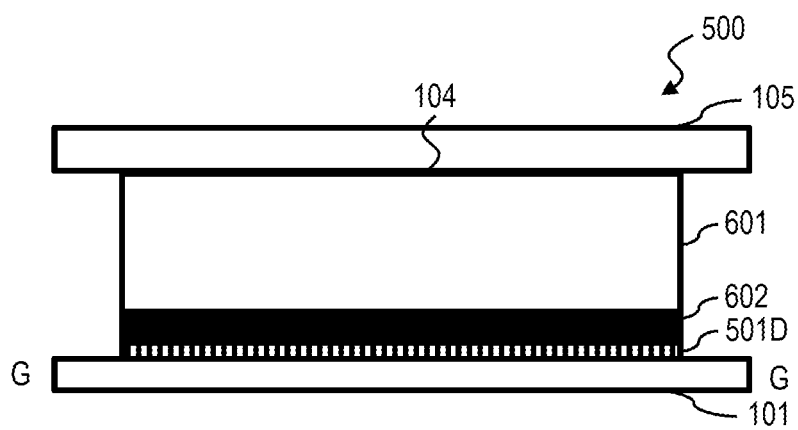

Specifically, FIG. 6C is a plane diagram of the light distribution control element 500 illustrated in FIG. 5A when the light distribution control element 500 is set to the wide viewing angle mode. FIG. 6A is a cross-sectional diagram of the light distribution control element 500 cut along the line E-E extending in the direction orthogonal to a long side of a control electrode 501 of the light distribution control element 500. FIG. 6B is a cross-sectional diagram of the overlap region of the first control electrode 501C and an electrophoretic element 104 cut along the line F-F extending in the longitudinal direction of the first control electrode 501C. FIG. 6D is a cross-sectional diagram of the overlap region of the second control electrode 501D and an electrophoretic element 104 cut along the line G-G extending in the longitudinal direction of the second control electrode 501D.

In the wide viewing angle mode, the potentials of the control electrodes 501 are controlled so that a predetermined potential difference (for example, approximately 20 to 25 V DC) is generated between the first control electrodes and the second control electrodes. In the example of FIG. 6A, the first control electrodes 501A and 501C are provided with negative potentials and the second control electrodes 501B and 501D are provided with positive potentials. In this condition, a potential gradient is generated within each electrophoretic element 104; the electrophoretic particles in the electrophoretic element 104 gather around the control electrode having the polarity opposite to the polarity of the charge of the electrophoretic particles.

Since the electrophoretic particles are charged negatively in the example of FIG. 6A, they gather around the positive second control electrodes 501B and 501D. As a result, in each electrophoretic element 104, the region close to the second control electrode 501B or 501D where the electrophoretic particles are collected becomes a light blocking region 602 having a light blocking property. On the other hand, the region distant from the second control electrode 501B or 501D becomes less dense with electrophoretic particles to become a transparent region 601 that transmits light.

As a result, Embodiment 2 of this invention achieves high optical transmittance in the wide viewing angle mode and low power consumption, like Embodiment 1.

The light distribution control element 500 in this embodiment is applicable to a display device and an illumination device, like the light distribution control element 100 in Embodiment 1 (see FIGS. 2E and 2F).

Figure 7:
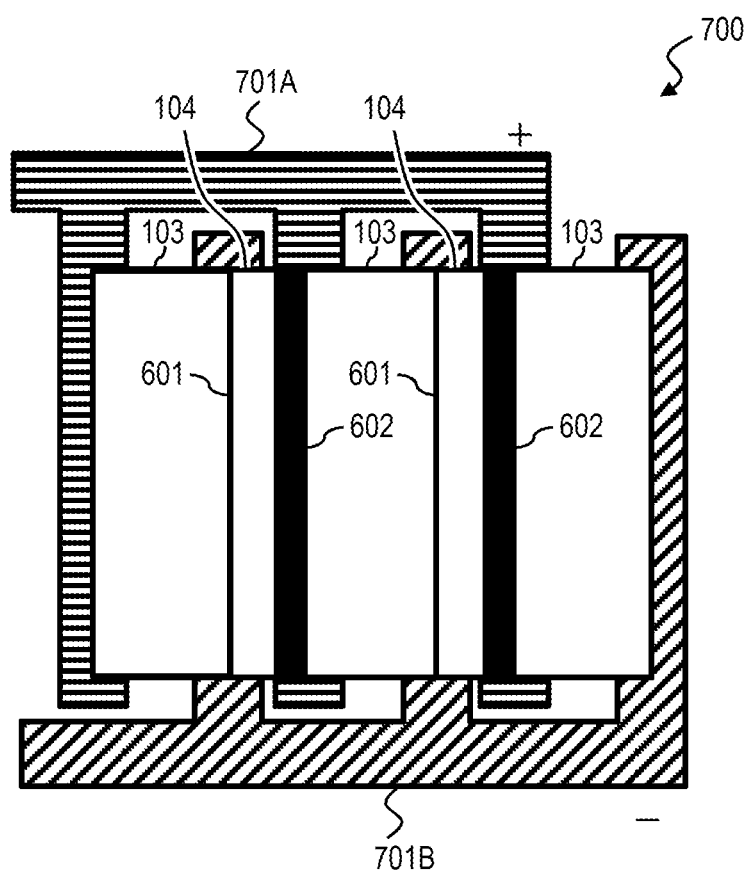
FIG. 7 is an explanatory diagram for illustrating another example of the shape of control electrodes in the light distribution control element in Embodiment 2.

FIG. 7 is an explanatory diagram for illustrating another example of the shape of the control electrodes in the light distribution control element in Embodiment 2.

Specifically, FIG. 7 is a plane diagram of a light distribution control element 700 as a modified example of the light distribution control element 500 in Embodiment 2. The light distribution control element 700 is the same as the light distribution control element 500 except that the above-described control electrodes 501A to 501D in Embodiment 2 are replaced by control electrodes 701A and 701B. Like FIG. 5B, FIG. 7 omits the lower transparent substrate 101 and the upper transparent substrate 105.

The control electrode 701A is integrally formed in such a shape that strip-like transparent conductive films like the first control electrodes 501A and 501C in FIG. 5B are connected at one end. In similar, the control electrode 701B is integrally formed in such a shape that strip-like transparent conductive films like the second control electrodes 501B and 501D in FIG. 5B are connected together at the other end. In the example of FIG. 7, the control electrode 701A corresponds to the first control electrode (first transparent conductive film) and the control electrode 701B corresponds to the second control electrode (second transparent conductive film).

Forming the electrodes in these shapes enables control using only two control electrodes and reduces the space of the wires for the control electrodes.

Alternatively, the control electrodes 501 described in Embodiment 2 can be replaced by the control electrodes having projections and indents like the control electrodes illustrated in FIG. 4A or 4B. That is to say, the control electrodes 501 in Embodiment 2 are strip-like control electrodes having their long sides in the direction parallel to the boundary between a rib 103 and an electrophoretic element 104 and have projections jutting toward the control electrodes adjacent thereto and indents recessed correspondingly to the projections of the adjacent control electrodes.

Embodiment 3

Hereinafter, Embodiment 3 of this invention is described. The following description omits the parts of Embodiment 3 in common with Embodiment 1 or Embodiment 2.

Figure 8A:
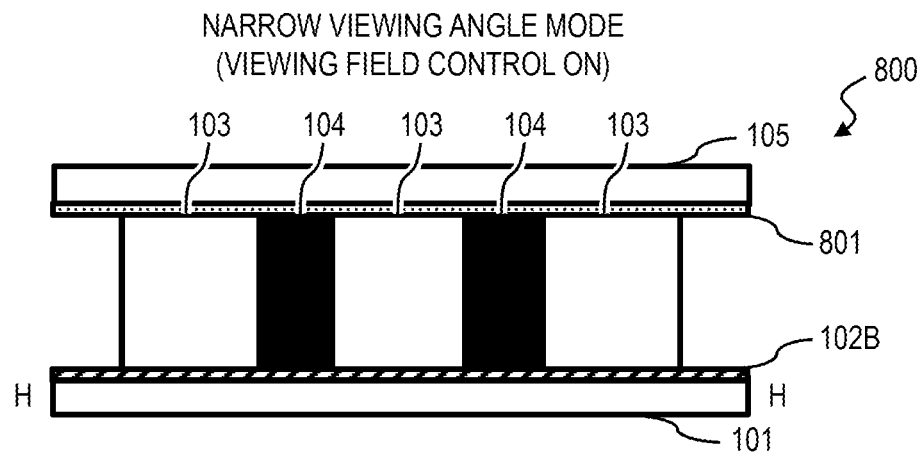
FIGS. 8A and 8B are explanatory diagrams for illustrating a structure of a light distribution control element in a narrow viewing angle mode in Embodiment 3.
Figure 8B:
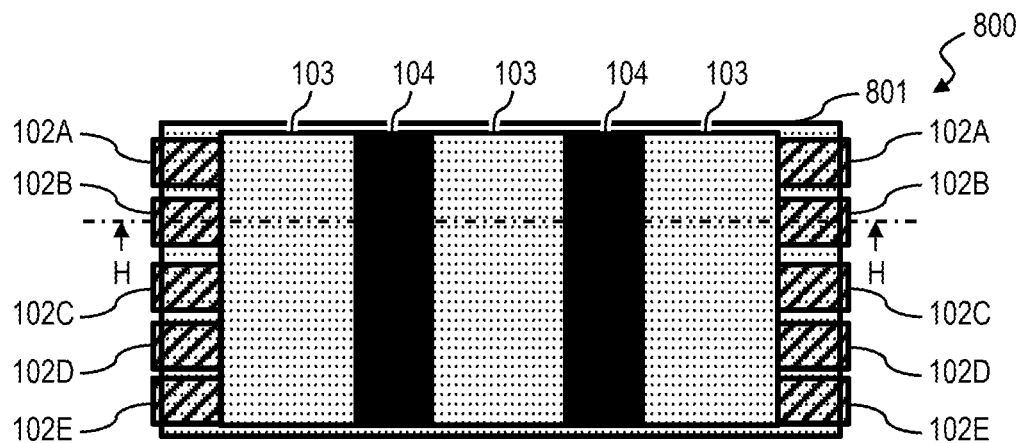

FIGS. 8A and 8B are explanatory diagrams for illustrating a structure of a light distribution control element in the narrow viewing angle mode in Embodiment 3.

The structure of the light distribution control element 800 in Embodiment 3 illustrated in FIGS. 8A and 8B is the same as the structure of the light distribution control element 100 in Embodiment 1 illustrated in FIGS. 1A and 1B, except that an auxiliary electrode 801 is newly provided. FIG. 8B is a plane diagram of the light distribution control element 800 in Embodiment 3 and FIG. 8A is a cross-sectional diagram cut along the line H-H in FIG. 8B. However, FIG. 8B omits the lower transparent substrate 101 and the upper transparent substrate 105 for convenience of explanation.

The auxiliary electrode 801 is a transparent conductive film (the third transparent conductive film) provided on the face of the upper transparent substrate 105 opposed to the lower transparent substrate 101. As illustrated in FIG. 8B, the auxiliary electrode 801 is provided to cover the entirety of the top faces of the plurality of ribs 103 and the plurality of electrophoretic elements 104 provided above the plurality of control electrodes 102. The control of the potential of the auxiliary electrode 801 will be described later (see FIGS. 10A to 10C).

Figure 9A:
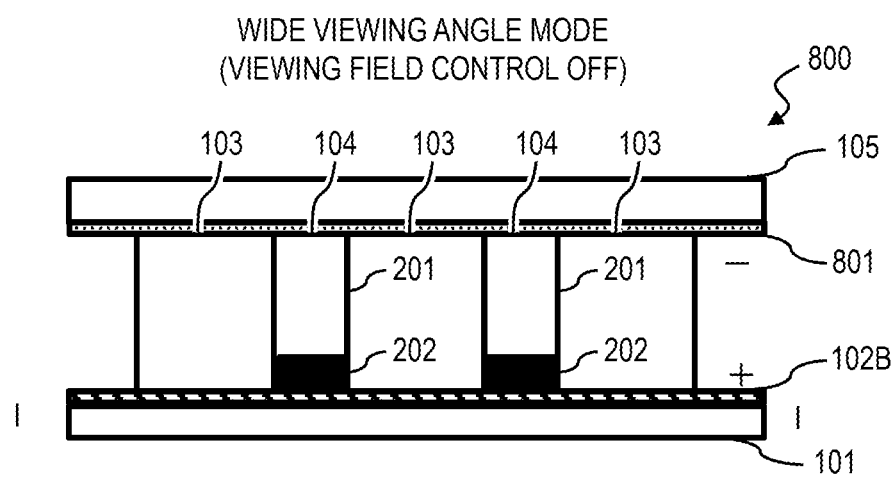
FIGS. 9A to 9C are explanatory diagrams for illustrating a structure of a light distribution control element in a wide viewing angle mode in Embodiment 3.
Figure 9B:
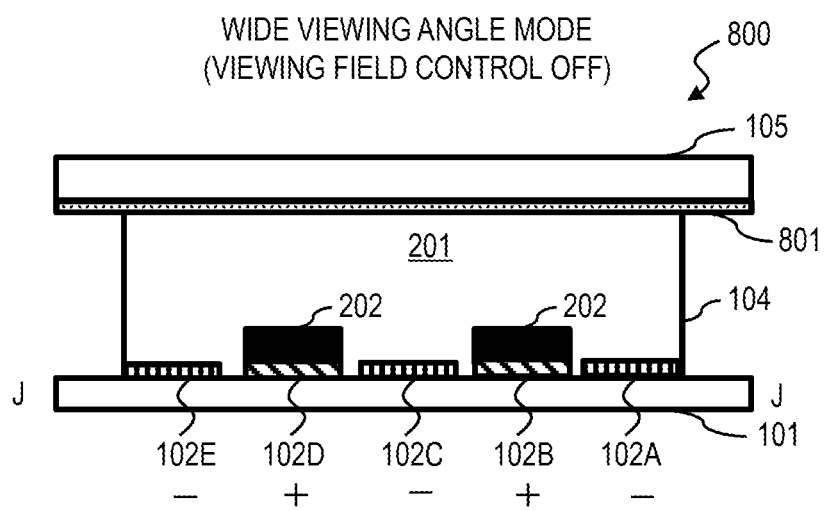
Figure 9C:
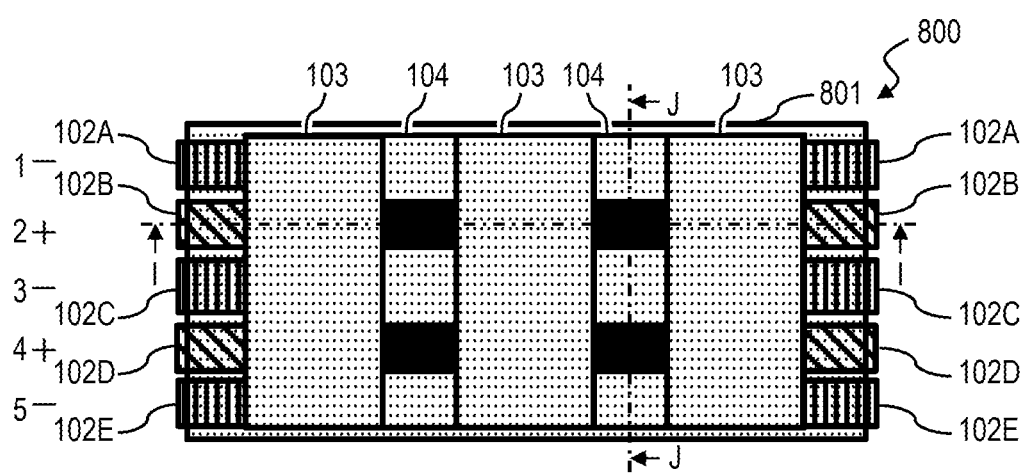

FIGS. 9A to 9C are explanatory diagrams for illustrating a structure of a light distribution control element in the wide viewing angle mode in Embodiment 3.

Specifically, FIG. 9C is a plane diagram of the light distribution control element 800 illustrated in FIG. 8A when the light distribution control element 800 is set to the wide viewing angle mode. FIG. 9A is a cross-sectional diagram of the light distribution control element 800 cut along the line I-I extending in the longitudinal direction of a control electrode 102 of the light distribution control element 800. FIG. 9B is a cross-sectional diagram of the same cut along the line J-J extending in the direction orthogonal to a long side of the control electrode 102.

Figure 10A:
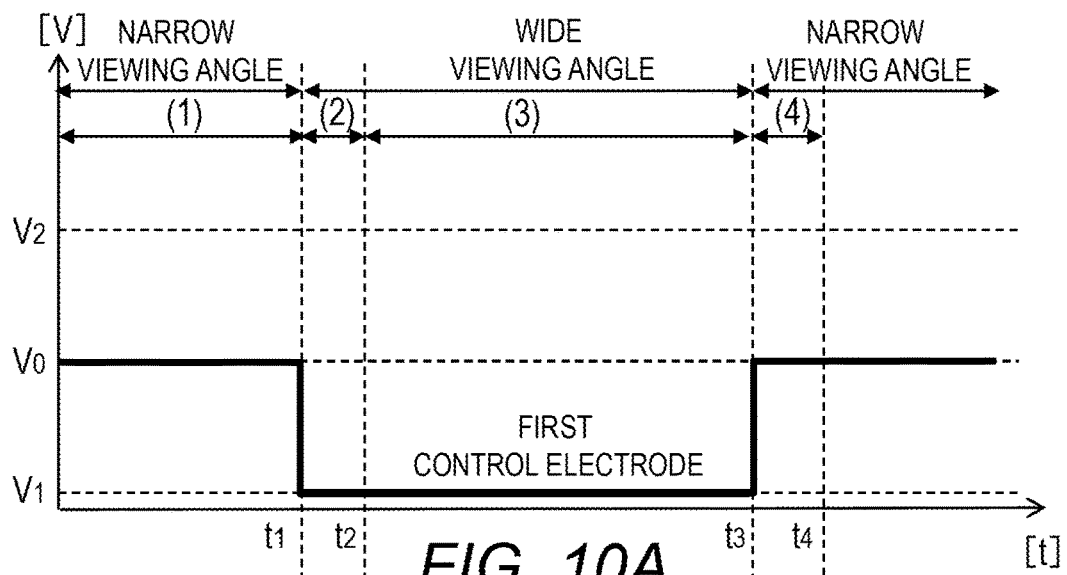
FIGS. 10A to 10 C are timing charts for illustrating a way to drive the control electrodes and an auxiliary electrode in the light distribution control element in Embodiment 3.
Figure 10B:
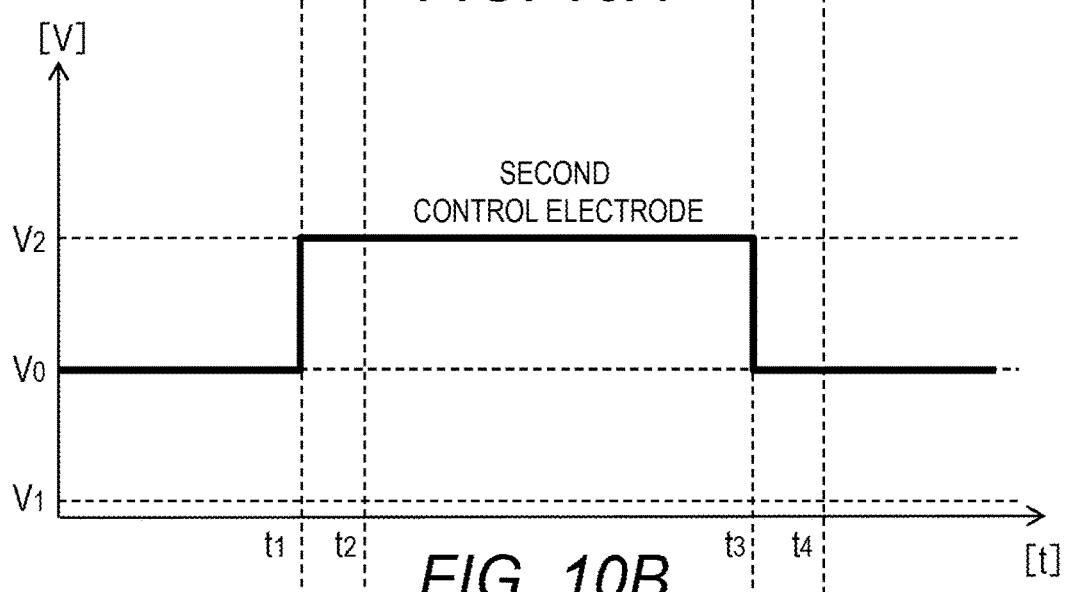
Figure 10C:
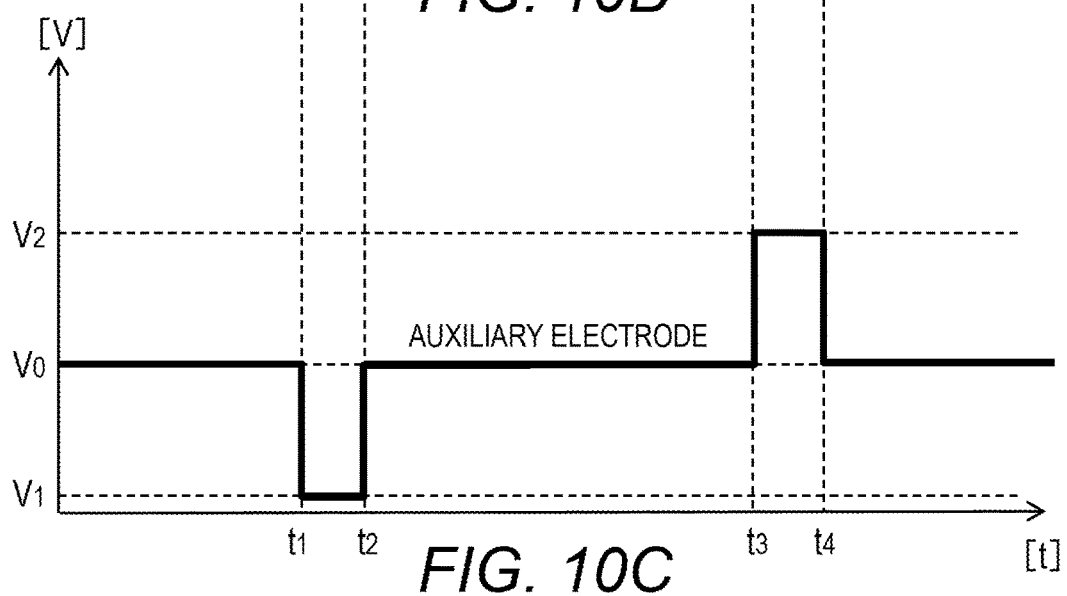

FIGS. 10A to 10C are timing charts for illustrating a way to drive the control electrodes and the auxiliary electrode in the light distribution control element in Embodiment 3.

FIG. 10A provides an example of the potential for the first control electrodes 102A, 102C, and 102E (in the odd-numbered rows in FIG. 8B) over time. FIG. 10B provides an example of the potential for the second control electrodes 102B and 102D (in the even-numbered rows in FIG. 8B) over time. FIG. 10C provides an example of the potential for the auxiliary electrode 801 over time.

In these examples, the light distribution control element 800 is changed from the narrow viewing angle mode to the wide viewing angle mode at a time t1 and thereafter, changed from the wide viewing angle mode to the narrow viewing angle mode at a time t3. Hereinafter, the potentials of the electrodes at each time are described with reference to FIGS. 10A to 10C.

In the narrow viewing angle mode until the time t1, all of the first control electrodes 102A, 102C, and 102E, the second control electrodes 102B and 102D, and the auxiliary electrode 801 are set to the same potential (V0 in the example of FIGS. 10A to 10C). In this condition, the electrophoretic particles are dispersed in each electrophoretic element 104 and the whole electrophoretic element 104 becomes a light blocker.

At the time t1, in order to change the light distribution control element 800 from the narrow viewing angle mode to the wide viewing angle mode, the potentials of the control electrodes 102 are controlled so that a predetermined potential difference (for example, approximately 20 to 25 V DC) is generated between the first control electrodes 102A, 102C, and 102E and the second control electrodes 102B and 102D. In the example of FIGS. 10A to 10C, the potentials of the first control electrodes 102A, 102C, and 102E are set to V1 and the potentials of the second control electrodes 102B and 102D are set to V2. In this example, the potential V2 is positive with respect to the potential V1.

In this example, the potential of the auxiliary electrode 801 is set to the same V1 as the first control electrodes 102A, 102C, and 102E for a predetermined period (or until a time t2) from the time t1 and thereafter, returned to the original V0. Since the first control electrodes 102A, 102C, and 102E are provided on the same side of the electrophoretic elements 104 (or on the side closer to the lower transparent substrate 101) in this invention, when a voltage is applied across the electrodes, the electric field generated on the other side different from the side where the control electrodes 102 are provided (or on the side closer of the upper transparent substrate 105) tends to be weaker than the electric field generated on the side where the control electrodes 102 are provided. However, the electric field in the area far from the control electrodes 102 becomes stronger by providing the auxiliary electrode 801 on the opposite side of the side provided with the control electrodes 102 to generate a predetermined potential difference between the auxiliary electrode 801 and the control electrodes 102 on the side where electrophoretic particles are collected. As a result, the electrophoretic particles quickly gather to the proximity of the second control electrodes 102B and 102D to produce light blocking regions and the other regions become transparent regions. The light distribution control element 800 changes from the narrow viewing angle mode to the wide viewing angle mode in a short transition time.

At the time t3, in order to change the light distribution control element 800 from the wide viewing angle mode to the narrow viewing angle mode, the potentials of the control electrodes 102 are controlled so that all the first control electrodes 102A, 102C, and 102E and the second control electrodes 102B and 102D have the same potential (V0 in the example of FIGS. 10A to 10C).

In this example, the potential of the auxiliary electrode 801 is set to the same V2 as the second control electrodes 102B and 102D in the wide viewing angle mode for a predetermined period (or until a time t4) from the time t3 and thereafter, returned to the original V0. With this operation, the electrophoretic particles collected around the second control electrodes 102B and 102D receive a force to attract them to the auxiliary electrode 801 (or a force to move them away from the second control electrodes 102B and 102D) only in the period from the time t3 to the time t4. Accordingly, appropriately determining the period from the time t3 to the time t4 enables the electrophoretic particles to quickly disperse within the electrophoretic element 104. The light distribution control element 800 can change from the wide viewing angle mode to the narrow viewing angle mode in a short transition time.

It should be noted that the voltages and the times to switch the voltage for the auxiliary electrode 801 illustrated in FIG. 10C are typical examples and various modifications can be provided. For example, the time to switch the potential of the auxiliary electrode 801 from V0 to V1 does not need to be the time t1 when the potentials of the control electrodes 102 are switched from the potentials for the narrow viewing angle mode to the potentials for the wide viewing angle mode and further, the potential of the auxiliary electrode 801 does not need to be the same potential V1. More specifically, the potential of the auxiliary electrode 801 needs to be controlled to be closer to the potentials of the first control electrodes 102A, 102C, and 102E than to the potentials of the second control electrodes 102B and 102D for at least a certain period after the time t1. The period can be started later than the time t1. Such control expedites collection of the electrophoretic particles in switching from the narrow viewing angle mode to the wide viewing angle mode.

Alternatively, the potential of the auxiliary electrode 801 can be maintained at V0 for the period from the time t1 to t2, if the electrophoretic particles are collected quickly enough only with the potential difference between the first control electrodes 102A, 102C, and 102E and the second control electrodes 102B and 102D.

In similar, the time to switch the potential of the auxiliary electrode 801 from V0 to V2 does not need to be the time t3 when the potentials of the control electrodes 102 are switched from the potentials for the wide viewing angle mode to the potentials for the narrow viewing angle mode and further, the potential of the auxiliary electrode 801 does not need to be the same V2. More specifically, the potentials of the auxiliary electrode 801 and the control electrodes 102 need to be controlled so that a predetermined potential difference is generated between the auxiliary electrode 801 and the control electrodes 102 and the polarity of the potential of the auxiliary electrode 801 is opposite to the polarity of the charge of the electrophoretic particles for at least a certain period after the time t3. The period in which such a potential is set to the auxiliary electrode 801 can be started later than the time t3. Such control expedites dispersion of the electrophoretic particles in switching from the wide viewing angle mode to the narrow viewing angle mode.

The light distribution control element 800 in FIG. 8B includes the same control electrodes 102A to 102E as those in FIG. 1B; however, instead of these, the light distribution control element 800 can include the control electrodes 301A to 301B in FIG. 3, the control electrodes 401A to 401H in FIGS. 4A and 4B, the control electrodes 501A to 501D in FIGS. 5A and 5B, or the control electrodes 701A and 701B in FIG. 7.

The first control electrodes 102A, 102C, and 102E in Embodiment 1 and the first control electrodes 501A and 501C in Embodiment 2 are also driven as indicated in the above-described FIG. 10A. In similar, the second control electrodes 102B and 102D in Embodiment 1 and the second control electrodes 501B and 501D in Embodiment 2 are also driven as indicated in the above-described FIG. 10B.

Figure 11:
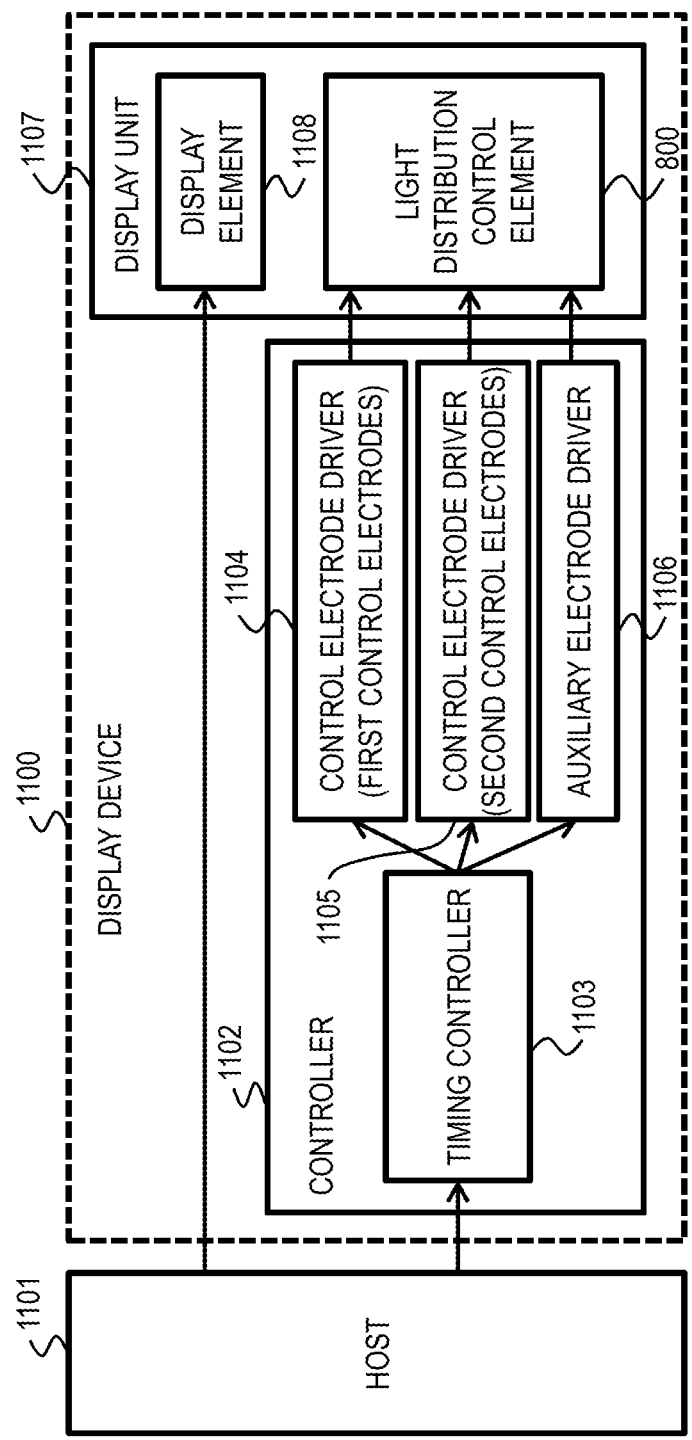
FIG. 11 is a block diagram for illustrating a configuration of a display device including the light distribution control element in Embodiment 3.

FIG. 11 is a block diagram for illustrating a configuration of the display device including the light distribution control element in Embodiment 3.

The display device 1100 in FIG. 11 includes a display unit 1107 and a controller 1102 connected with a host 1101. The display unit 1107 includes a light distribution control element 800 and a display element 1108. The controller 1102 controls the potentials to be applied to the light distribution control element 800.

The host 1101 and the display element 1108 can be the same as the host 211 and the display element 217, respectively, in FIG. 2D and therefore, the description thereof is omitted. The configuration and the disposition of the light distribution control element 800 and the display element 1108 in the display unit 1107 can also be the same as those of the light distribution control element 100 and the display element 217 in the display unit 216 in FIG. 2E and therefore, the description thereof is omitted.

The potentials to be applied to the control electrodes 102 and the auxiliary electrode 801 in the light distribution control element 800 are controlled by the controller 1102. The controller 1102 includes a timing controller 1103, a control electrode driver 1104, another control electrode driver 1105, and an auxiliary electrode driver 1106. The timing controller 1103 generates control signals for controlling when to change the potentials of the control electrodes 102 and the auxiliary electrode 801 and inputs them to the control electrode driver 1104, the control electrode driver 1105, and the auxiliary electrode driver 1106. The control electrode driver 1104, the control electrode driver 1105, and the auxiliary electrode driver 1106 respectively generate the potential to be applied to the first control electrodes 102A, 102C, and 102E, the potential to be applied to the second control electrodes 102B and 102D, and the potential to be applied to the auxiliary electrode 801 at desired times in accordance with the control signal from the timing controller 1103.

Now, a method of controlling the potentials of the control electrodes 102 and the auxiliary electrode 801 is described using the example illustrated in FIGS. 10A to 10C.

In this example, the timing controller 1103 inputs a control signal to change the potentials of the first control electrodes 102A, 102C, and 102E from V0 to V1 to the control electrode driver 1104 and inputs a control signal to change the potentials of the second control electrodes 102B and 102D from V0 to V2 to the control electrode driver 1105 at the time t1. In response, the control electrode driver 1104 applies a potential V1 to the first control electrodes 102A, 102C, and 102E in accordance with the control signal from the timing controller 1103 after the time t1. The control electrode driver 1105 applies a potential V2 to the second control electrodes 102B and 102D in accordance with the control signal from the timing controller 1103 after the time t1.

The timing controller 1103 further inputs a control signal to change the potentials of the first control electrodes 102A, 102C, and 102E from V1 to V0 to the control electrode driver 1104 and inputs a control signal to change the potentials of the second control electrodes 102B and 102D from V2 to V0 to the control electrode driver 1105 at the time t3. The control electrode driver 1104 applies a potential V0 to the first control electrodes 102A, 102C, and 102E in accordance with the control signal from the timing controller 1103 after the time t3. The control electrode driver 1105 applies a potential V0 to the second control electrodes 102B and 102D in accordance with the control signal from the timing controller 1103 after the time t3.

In similar, the timing controller 1103 inputs a control signal to change the potential of the auxiliary electrode 801 to V1 at the time t1, to V0 at the time t2, to V2 at the time t3, and to V0 at the time t4 to the auxiliary electrode driver 1106. The auxiliary electrode driver 1106 applies a potential V1 to the auxiliary electrode 801 after the time t1, a potential V0 after the time t2, a potential V2 after the time t3, and a potential V0 after the time t4 in accordance with the control signal.

The timing controller 1103 may generate the above-described control signals in response to a viewing angle mode switching signal from the host 1101. For example, when the user of the host 1101 inputs an instruction to change the viewing angle mode from the narrow viewing angle mode to the wide viewing angle mode to the host 1101, the host 1101 sends the instruction to the timing controller 1103 and the timing controller 1103 in receipt of the instruction generates the control signals generated at the time t1 and the time t2. In similar, when the user of the host 1101 inputs an instruction to change the viewing angle mode from the wide viewing angle mode to the narrow viewing angle mode to the host 1101, the host 1101 sends the instruction to the timing controller 1103 and the timing controller 1103 in receipt of the instruction generates the control signals generated at the time t3 and the time t4.

As a result of the above-described control by the controller 1102, a display device with the light distribution control element 800 can switch the wide viewing angle mode and the narrow viewing angle mode at appropriate times. Furthermore, if the timing controller 1103 sets the period from the time t1 to t2 to a period long enough for the electrophoretic particles to gather and sets the period from the time t3 to t4 to a period for the electrophoretic particles to disperse appropriately, the display device can switch the wide viewing angle mode and the narrow viewing angle mode more quickly.

Although FIG. 11 provides an example where the light distribution control element 800 in this embodiment is applied to a display device, the light distribution control element 800 is applicable to an illumination device. Specifically, like in FIG. 2F, the display element 1108 is replaced by a light source such as a cold cathode tube or an LED. The host 1101 can be omitted; in that case, an instruction to change the viewing angle mode from the narrow viewing angle mode to the wide viewing angle mode or from the wide viewing angle mode to the narrow viewing angle mode is input to the controller 1102 through a not-shown input device such as a button. The timing controller 1103 generates control signals like the above-described ones in accordance with the received instruction and inputs them to the control electrode driver 1104, the control electrode driver 1105, and the auxiliary electrode driver 1106. As a result, the range of outgoing direction of the light emitted from the light source and transmitted through the light distribution control element 800 is controlled. In this case, too, the wide viewing angle mode and the narrow viewing angle mode can be switched quickly, like the foregoing case.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A light distribution control element comprising:
a first transparent substrate;
a second transparent substrate provided to be opposed to the first transparent substrate;
a plurality of first control electrodes and a plurality of second control electrodes provided on a face of the first transparent substrate that is opposed to the second transparent substrate;
a plurality of light-transmissive regions provided between the first transparent substrate and the second transparent substrate; and
a plurality of electrophoretic elements including electrophoretic particles charged to a specific polarity and having a light blocking property and an optically transmissive dispersant, each electrophoretic element being provided between two light-transmissive regions adjacent to each other,
wherein each of the plurality of electrophoretic elements is formed in a rectangular parallelepiped,
wherein the plurality of first control electrodes and the plurality of second control electrodes are disposed in such a manner that at least a part of at least one of the first control electrodes and at least a part of at least one of the second control electrodes both overlap with each of the plurality of electrophoretic elements,
wherein each of the plurality of first control electrodes and the plurality of second control electrodes is formed to have a strip-like shape having a long side extending in a direction orthogonal to a boundary between a light-transmissive region and an electrophoretic element and the plurality of first control electrodes and the plurality of second control electrodes are disposed alternately, and
wherein a dispersion of the electrophoretic particles changes depending on a potential difference between the plurality of first control electrodes and the plurality of second control electrodes to change a range of an outgoing direction of light transmitted through the light distribution control element.

2. The light distribution control element according to claim 1,
wherein the plurality of first control electrodes are formed to be connected together at ends in a first direction along the long side, and
wherein the plurality of second control electrodes are formed to be connected together at ends in a second direction along the long side that is opposite to the first direction.

3. The light distribution control element according to claim 1,
wherein each of the plurality of first control electrodes is formed in such a shape that a side opposed to an adjacent second control electrode has a plurality of projections jutting out toward the adjacent second control electrode and a plurality of indents recessed away from the adjacent second control electrode, and
wherein each of the plurality of second control electrodes is formed to have a plurality of indents corresponding to the plurality of projections of an adjacent first control electrode and a plurality of projections corresponding to the plurality of indents of the adjacent first control electrode.

4. The light distribution control element according to claim 1, further comprising a controller configured to control a viewing angle of the light distribution control element,
wherein the controller is configured to:
control potentials of the plurality of first control electrodes and the plurality of second control electrodes to generate a predetermined potential difference between the plurality of first control electrodes and the plurality of second control electrodes in order to expand the range of an outgoing direction of light transmitted through the light-transmissive regions and the dispersant; and
control potentials of the plurality of first control electrodes and the plurality of second control electrodes are to be at the same potential in order to narrow down the range of the outgoing direction of light transmitted through the light-transmissive regions and the dispersant.

5. The light distribution control element according to claim 1, further comprising:
a third control electrode provided on a face of the second transparent substrate that is opposed to the first transparent substrate; and
a controller configured to control a viewing angle of the light distribution control element,
wherein the controller is configured to:
control potentials of the plurality of first control electrodes and the plurality of second control electrodes to generate a predetermined potential difference between the plurality of first control electrodes and the plurality of second control electrodes in order to expand the range of an outgoing direction of light transmitted through the light-transmissive regions and the dispersant; and
control potentials of the plurality of first control electrodes and the plurality of second control electrodes to be at the same potential and further control a potential of the third control electrode to generate predetermined potential differences from the potentials of the plurality of first control electrodes and the potentials of the plurality of second control electrodes and have an opposite polarity from an electric charge of the electrophoretic particles for a predetermined period, in order to narrow down the range of the outgoing direction of light transmitted through the light-transmissive regions and the dispersant.

6. The light distribution control element according to claim 5, wherein the controller is configured to further control the potential of the third control electrode to get closer to the potentials of the plurality of first control electrodes than to the potentials of the plurality of second control electrodes for a predetermined period in a case where the potentials of the plurality of first control electrodes have the same polarity as the potentials of the plurality of second control electrodes, in order to expand a range of outgoing direction of light transmitted through the light-transmissive regions and the dispersant.

7. A display device comprising:
the light distribution control element according to claim 1;
a display element; and
a controller,
wherein the display element is provided on the other side of the first transparent substrate different from a side opposed to the second transparent substrate.

8. An illumination device comprising:
the light distribution control element according to claim 1;
a light source; and
a controller,
wherein the light source is provided on the other side of the first transparent substrate different from a side opposed to the second transparent substrate.

9. A light distribution control element comprising:
a first transparent substrate;
a second transparent substrate provided to be opposed to the first transparent substrate;
a plurality of first control electrodes and a plurality of second control electrodes provided on a face of the first transparent substrate that is opposed to the second transparent substrate;
a plurality of light-transmissive regions provided between the first transparent substrate and the second transparent substrate; and
a plurality of electrophoretic elements including electrophoretic particles charged to a specific polarity and having a light blocking property and an optically transmissive dispersant, each electrophoretic element being provided between two light-transmissive regions adjacent to each other,
wherein each of the plurality of electrophoretic elements is formed in a rectangular parallelepiped,
wherein the plurality of first control electrodes and the plurality of second control electrodes are disposed in such a manner that at least a part of at least one of the first control electrodes and at least a part of at least one of the second control electrodes both overlap with each of the plurality of electrophoretic elements,
wherein each of the plurality of first control electrodes and the plurality of second control electrodes is formed to have a strip-like shape having a long side extending in a direction parallel to a boundary between a light-transmissive region and an electrophoretic element and each electrophoretic element is disposed to overlap with one first control electrode in a part and overlap with one second control element in another part, and
wherein dispersion of the electrophoretic particles changes depending on a potential difference between the plurality of first control electrodes and the plurality of second control electrodes to change a range of an outgoing direction of light transmitted through the light distribution control element.

10. The light distribution control element according to claim 9,
wherein the plurality of first control electrodes are formed to be connected together at ends in a first direction along the long side, and
wherein the plurality of second control electrodes are formed to be connected together at ends in a second direction along the long side that is opposite to the first direction.

11. The light distribution control element according to claim 9, further comprising a controller configured to control a viewing angle of the light distribution control element,
wherein the controller is configured to:
control potentials of the plurality of first control electrodes and the plurality of second control electrodes to generate a predetermined potential difference between the plurality of first control electrodes and the plurality of second control electrodes in order to expand the range of an outgoing direction of light transmitted through the light-transmissive regions and the dispersant; and
control potentials of the plurality of first control electrodes and the plurality of second control electrodes to be at the same potential in order to narrow down the range of the outgoing direction of light transmitted through the light-transmissive regions and the dispersant.

12. The light distribution control element according to claim 9, further comprising:
a third control electrode provided on a face of the second transparent substrate that is opposed to the first transparent substrate; and
a controller configured to control a viewing angle of the light distribution control element,
wherein the controller is configured to:
control potentials of the plurality of first control electrodes and the plurality of second control electrodes to generate a predetermined potential difference between the plurality of first control electrodes and the plurality of second control electrodes in order to expand the range of an outgoing direction of light transmitted through the light-transmissive regions and the dispersant; and
control potentials of the plurality of first control electrodes and the plurality of second control electrodes to be at the same potential and further control a potential of the third control electrode to generate predetermined potential differences from the potentials of the plurality of first control electrodes and the potentials of the plurality of second control electrodes and have an opposite polarity from an electric charge of the electrophoretic particles for a predetermined period, in order to narrow down the range of an outgoing direction of light transmitted through the light-transmissive regions and the dispersant.

13. The light distribution control element according to claim 12, wherein the controller is configured to further control the potential of the third control electrode to get closer to the potentials of the plurality of first control electrodes than to the potentials of the plurality of second control electrodes for a predetermined period in a case where the potentials of the plurality of first control electrodes have the same polarity as the potentials of the plurality of second control electrodes, in order to expand a range of the outgoing direction of light transmitted through the light-transmissive regions and the dispersant.

14. A display device comprising:
the light distribution control element according to claim 9;
a display element; and
a controller,
wherein the display element is provided on the other side of the first transparent substrate different from a side opposed to the second transparent substrate.

15. An illumination device comprising:
the light distribution control element according to claim 9;
a light source; and
a controller,
wherein the light source is provided on the other side of the first transparent substrate different from a side opposed to the second transparent substrate.

* * * * *